Nov. 5, 1935.  W. L. BRYANT  2,020,134
INTERNAL GAUGE
Filed Sept. 2, 1931
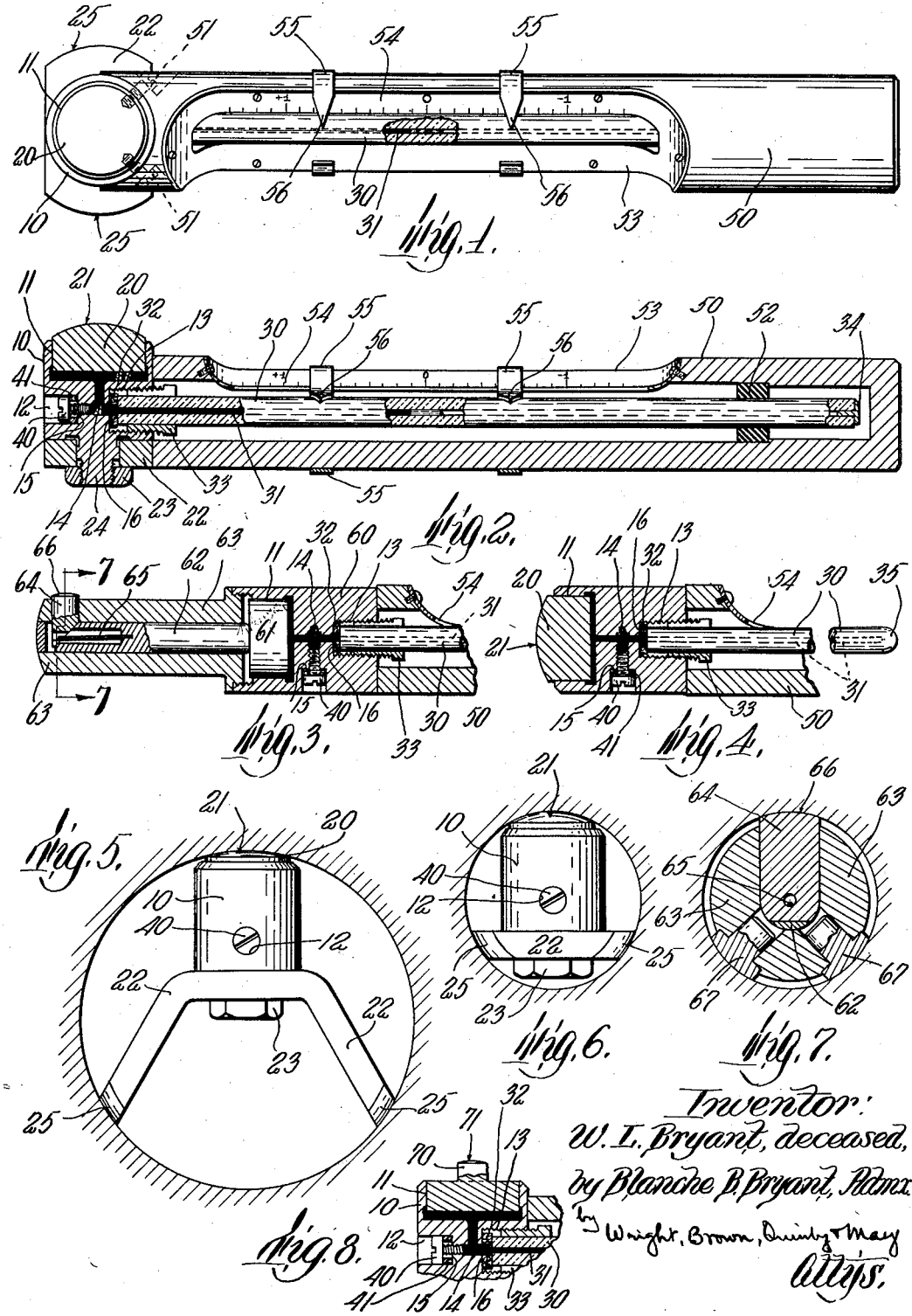

Patented Nov. 5, 1935

2,020,134

UNITED STATES PATENT OFFICE 2,020,134

INTERNAL GAUGE

William L. Bryant, deceased, late of Springfield, Vt., by Blanche Brown Bryant, administratrix, Springfield, Vt., assignor to Bryant Chucking Grinder Company, Springfield, Vt., a corporation of Vermont Application September 2, 1931, Serial No. 560,803

3 Claims. (Cl. 33—178)

This application is a continuation-in-part of the co-pending application of William L. Bryant, Serial No. 498,947, filed November 29, 1930, for Internal gauges. The invention relates to gauges for testing diameters of holes and has for an object to produce such a gauge of the liquid type which is simple in structure and which will give accurate measurements without requiring great care on the part of the user in presenting the gauge to the work. In addition to simplicity of structure, this gauge is marked by durability and ruggedness, and can be used in any position.

Further objects and advantageous combinations will appear from a more complete description of certain embodiments of the invention shown in the accompanying drawing in which Figure 1 is a plan view of a gauge embodying the invention.

Figure 2 is a longitudinal section of the same.

Figures 3 and 4 are fragmentary longitudinal sections of somewhat different gauge structures.

Figure 5 is an end elevation of the form of gauge shown in Figures 1 and 2.

Figure 6 is a similar end elevation of a gauge made for the measurement of a smaller diameter.

Figure 7 is a section on the line 7—7 of Figure 3.

Figure 8 is a fragmentary sectional view of a gauge, showing another shape of work-engaging plunger.

Figures 1 and 2 illustrate the gauge embodying the invention. This gauge comprises a block 10 having a bore 11 of large diameter entering one face thereof, a bore 12 of smaller diameter entering another face thereof and a bore 13 entering a third face. These bores all communicate with each other through a suitable passage 14 which includes reduced portions of the bores 12 and 13. These form respectively a pair of shoulders 15 and 16 within the block. A plunger 20 is slidably mounted in the bore 11, forming a chamber therein which is variable in capacity as the plunger slides in or out. The outer end 21 of the plunger 20 is preferably provided with a spherical surface having a curvature substantially equal to the curvature of the work to be gauged. At the end of the block opposite to the plunger 20, the second work engaging member 22 may be secured as by a nut 23 threaded on to a threaded extension 24 of the block. As shown in Figures 5 and 6, the work engaging extremities 25 of the member 22 are also provided with spherical surfaces of the same curvature as the work engaging surface 21 so that when the gauge is inserted in a cylindrical hole to be gauged, it is not necessary that the gauge be held accurately in a certain position. Thus the gauge may be depended upon to give accurate internal diameter measurements even when carelessly inserted in a bore to be gauged.

Secured to the block 10 is a tube 30 of glass or other transparent material, this tube having a relatively small bore 31. An end of this tube engages a washer 32 of resilient material such as rubber, leather or the like, this washer being located against the shoulder 16 in the bore 13. The bore 13 is taper threaded to receive a split nut 33 which fits snugly about the tube 30. When the tube 30 is attached to the block 10, its end is thrust through a split nut 33 and a washer 32 is inserted in the bore 13. The nut 33 is then screwed into the threaded bore 13 until it begins to bind. The tube 30 is then pushed snugly against the washer 32, after which the nut 33 is then set up tightly. As the nut is set up, it grips the tube 30 and presses its end against the washer 32, thus making reliable seal between the end of the tube and the block. As shown in Figure 2, the bore 31 of the tube communicates through the channel 14 with the chamber in the bore 11. The latter, together with a portion of the bore 31, are filled with a suitable liquid such as mercury. A small quantity of a transparent liquid may be employed in the bore 31 next to the end of the mercury column therein. The free end of the tube 30 is tightly sealed as by a plug 34 of hard cement or other suitable material or by fusing the end of the tube and sealing it off as indicated at 35 in Figure 4.

For adjusting the gauge, a suitable screw 40 is inserted in the bore 12, the screw being threaded into the reduced portion of this bore. The head of the screw 40 engages a resilient washer 41 which is seated against the shoulder 15. This washer forms an effective seal to prevent the escape of fluid through the bore 12. It also acts to hold the adjusting screw 40 in any position of adjustment.

Projecting laterally from the block 10 is a tubular casing 50 which may be secured to the block as by a pair of screws 51. This casing surrounds the tube 30 and is spaced therefrom. A suitable bushing 52 is provided near the free end of the tube 30 to hold the tube in spaced relation to the casing. This resilient bushing 52 also helps to protect the tube against injury if the gauge is dropped. The casing 50 is laterally cut away as at 53 to expose a substantial portion of the tube 30. A convenient scale may be marked along an edge of a cover plate 54 which, as shown in Figure 1, is secured to the surfaces of the casing formed by the cutout 53 and partly closes the aperture formed by the cutout so that the graduated edge of the cover plate 54 is closely adjacent to a portion of the tube 30. This facilitates the reading of the gauge. A pair of pointers 55 may be provided to indicate tolerance limits or for any other purpose. These pointers, as shown, may consist of strips of metal bent around the casing 50 so that their ends are turned in over portions of the plate 54, one of these ends being pointed as at 56.

Figure 3 shows a gauge with parts arranged somewhat differently to facilitate measurements of bores of relatively small diameter. As shown, the gauge may consist of a block 60 having the large bore 11 in line with the bore 13 which receives the end of the tube 30. The plunger 61 does not project from the block but engages an end of a rod 62 which is slidably mounted in a housing 63 secured to the block 60. The opposite end of the rod 62 is beveled and engages a beveled face of a short plunger 64 which is slidable at right angles thereto. The outer end of the plunger 64 is preferably shaped as at 66 to engage the work. A pair of suitable buttons 67 (Figure 7) are mounted in the side of the casing 63 to cooperate with the plunger 64 by engaging within the bore the work to be tested. These buttons are spherically faced. A suitable leaf spring 65 is provided to hold the plunger 64 in its innermost position so that the rod 62 is held against the inner plunger 61, otherwise, the gauge is constructed substantially as hereinbefore described.

In the form of gauge illustrated in Figure 4 the work-engaging plunger is arranged in line with the glass tube instead of at right angles thereto. This type of gauge is adapted to be mounted in a suitable frame or equivalent structure for the measurement of exterior dimensions.

Figure 8 illustrates a modified form of the plunger 20. Instead of having a spherically surfaced work engaging face 21 extending over the whole end of the plunger 20, a reduced portion 70 projects from the outer face of the plunger 20, this reduced portion having a spherically surfaced work-engaging face 71.

It is evident that many changes and modifications can be made in the embodiments of the invention herein shown and described without departing from the spirit and scope of the invention as defined in the following claims.

It is claimed:

1. A portable gauge for testing internal diameters, comprising a block with a chamber therein, means carried by said block including a work-engaging surface and a plunger slidably fitted in said chamber to cooperate with said surface, fixed work-engaging elements on said block spaced angularly with respect to said surface, a tube of transparent material communicating at one end with said chamber and having an unyielding seal closing its other end, and a liquid in said chamber in direct contact with a face of said plunger, said liquid extending into said tube to form a column therein varying in length in accordance with the position of the plunger.

2. A portable gauge comprising a block having a chamber therein, means carried by said block including a work-engaging surface and a plunger slidably fitted within said chamber to cooperate with said surface, a tube of transparent material communicating at one end with said chamber and having an unyielding seal closing its other end, a quantity of a liquid in said chamber in direct contact with a face of said plunger and extending into said tube, and a small quantity of a wash-liquid in said tube adjacent to the free end of the column of other liquid therein.

3. In a portable gauge having a chamber for measurement-indicating liquid, adjustment means comprising a compressible washer, and a headed screw projecting through said washer and into the liquid in said chamber, said head bearing against said washer to compress the same, whereby said washer acts as a seal to prevent leakage from the chamber and frictionally locks said screw in adjusted position.

BLANCHE BROWN BRYANT.
*Administratrix of the Estate of William L. Bryant, Deceased.*